United States Patent [19]
Nunnally et al.

[11] Patent Number: 5,570,280
[45] Date of Patent: Oct. 29, 1996

[54] METHOD FOR CONTROLLING ELECTRO-MECHANICAL DEVICES

[75] Inventors: Stephen C. Nunnally, Bridgewater; Perry A. Pierce, Darien; Peter K. Zanger, Naugatuck, all of Conn.

[73] Assignee: Pitney Bowes Inc., Stamford, Conn.

[21] Appl. No.: 338,726

[22] Filed: Nov. 14, 1994

[51] Int. Cl.$^6$ ..................................................... G06F 19/00
[52] U.S. Cl. ........................................ 364/140; 364/478.08
[58] Field of Search ..................................... 364/140, 141, 364/146, 147, 468, 478, DIG. 2; 270/58; 395/823, 825, 826, 892

[56] References Cited

U.S. PATENT DOCUMENTS

| | | | |
|---|---|---|---|
| 4,740,349 | 4/1988 | Loftus et al. | 364/140 X |
| 4,745,541 | 5/1988 | Vaniglia et al. | 364/141 |
| 4,825,352 | 4/1989 | Iijima et al. | 364/140 |
| 4,827,396 | 5/1989 | Taniguchi | 364/140 |
| 5,003,485 | 3/1991 | Francisco | 364/132 X |
| 5,128,857 | 7/1992 | Okada et al. | 364/140 |
| 5,383,117 | 6/1995 | Takai | 364/141 |

*Primary Examiner*—Joseph Ruggiero
*Attorney, Agent, or Firm*—Charles R. Malandra, Jr.; Melvin J. Scolnick

[57] ABSTRACT

In a microprocessor-controlled apparatus a plurality of event vector tables and a plurality of event action blocks are defined and stored in memory to provide a determined set of actions to be performed in correspondence to activation by respective determined events. A profile interpreter processes action function sequences from these tables and commands the corresponding actions, sets a corresponding event-occurred flag and thereafter commands other actions and manipulates the flag by operation of respective profile action functions associated with the respective operations of the apparatus. The levels of operation may be arranged hierarchically so that additional modules may be added at a lower level without altering the control functions provided at the higher level. All of the primitive functions that can be realistically supported by the device controller are preferably included in the base software. Aggregate functions may be designed to support complex I/O functions such as scanning. In accordance with the invention these functions are activated by device profiles that are downloaded by the system software to each device controller during application initialization. These profiles can also be hard-coded into a source-format include-file to accommodate a standalone operation without download capability. Mailpiece tracking is included in the method.

9 Claims, 10 Drawing Sheets

METHOD FOR CONTROLLING ELECTRO-MECHANICAL DEVICES

FIELD OF THE INVENTION

The invention relates to systems control methods and apparatus and more particularly to an improved control method for paper handling apparatus such as insertion devices.

BACKGROUND OF THE INVENTION

Various methods for control of insertion devices have been devised. While many of these methods can work quite well, it has been found that these known methods require numerous significant control software configuration changes as a system configuration changes.

U.S. Pat. No. 3,709,482 to Nelson, et al describes a high speed document feeder using synchronous operation.

U.S. Pat. No. 3,825,251 discloses a system for controlling the feed of documents into and along a document path. The device can be made to operate synchronously if the longest document length is used to determine the maximum throughput or asynchronously in that the document by its own length may be used to determine the throughput rate. The lengths in the asynchronous mode are used to adjust the speeds of various rollers in the document path to determine the degree of inter-document spacing. This reference does not teach or suggest a method for dealing with changes in the configuration of the device.

U.S. Pat. No. 5,003,485 describes an asynchronous communication protocol for a collating and insertion device. U.S. Pat. No. 5,012,073 describes a card and mailer data inserter system which includes an operator means for manual override and a means for re-initiating automatic operation.

SUMMARY OF THE INVENTION

It is therefore an object of the invention to provide a control system which provides a software control program which is configurable at run time to selectively use available I/O control features provided by the hardware.

It is a further object of the invention to provide an event-action method of control in microprocessor software such that new mechanical configurations can be supported without changing the base control software.

The above and other objects are attained in a method for controlling a plurality of operations in a microprocessor-controlled apparatus, the method comprising the steps of defining and storing in a memory a plurality of event vector tables and a plurality of event action blocks which provide a determined set of actions to be performed in correspondence to activation by respective determined events, providing determined action function sequences and a profile interpreter for processing the action function sequences, upon receipt of indication of occurrence of at least one of the determined events, the profile interpreter commanding the corresponding actions and setting a corresponding event-occurred flag and thereafter commanding other actions and manipulating the flag by operation of respective profile action functions associated with the respective operations of the apparatus. In another aspect the levels of operation may be arranged hierarchically so that additional modules may be added at a lower level without altering the control functions provided at the higher level.

All of the primitive functions that can be realistically supported by the device controller are preferably included in the base software. It will be appreciated that aggregate functions may be designed to support complex I/O functions such as scanning. In accordance with the invention these functions are activated by device profiles that are downloaded by the system software to each device controller during application initialization. These profiles can also be hard-coded into a source-format include-file to accommodate a standalone operation without download capability.

Other processing considerations in accordance with the invention include state processing and mailpiece tracking.

DESCRIPTION OF THE PREFERRED EMBODIMENT

Figure 1:
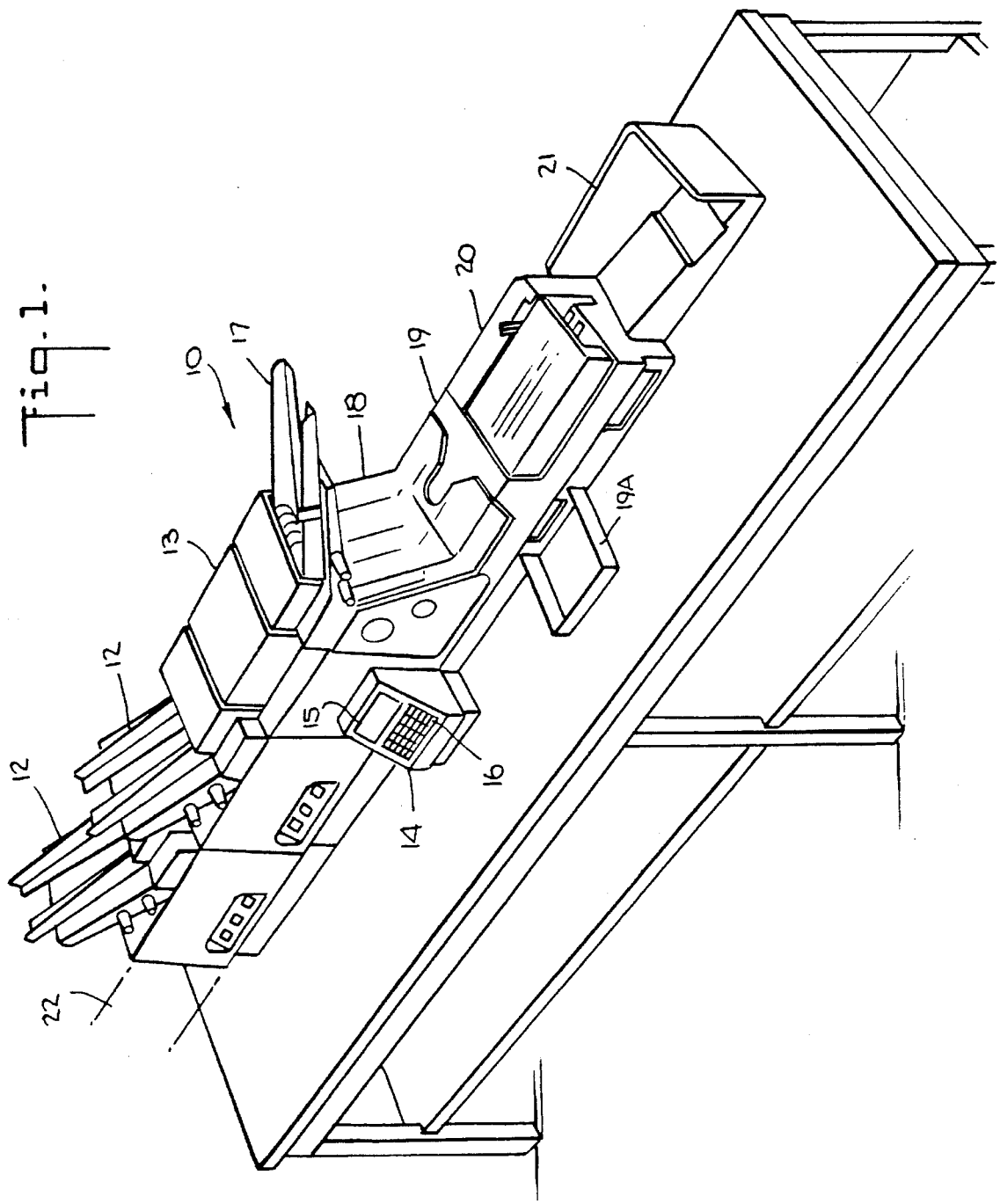
FIG. 1 is a perspective view of conventional apparatus in which a control method in accordance with the invention may reside.

In FIG. 1 there is shown generally at 10 an inserter device in which a control system in accordance with the invention may be incorporated. In the apparatus illustrated, there are two document feeding stations shown at 12, a keyboard 12a, transport station 13, control station 14 with a display 15 and data keyboard 16, envelope feeding station 7 and envelope-stuffing station 18, turning and ejection station 19, moistener and sealer 20 and a stacking station 21. Other feeding stations may be added as indicated by the dashed lines 22 as well as bursting and folding modules (not shown) as desired.

Figure 2:
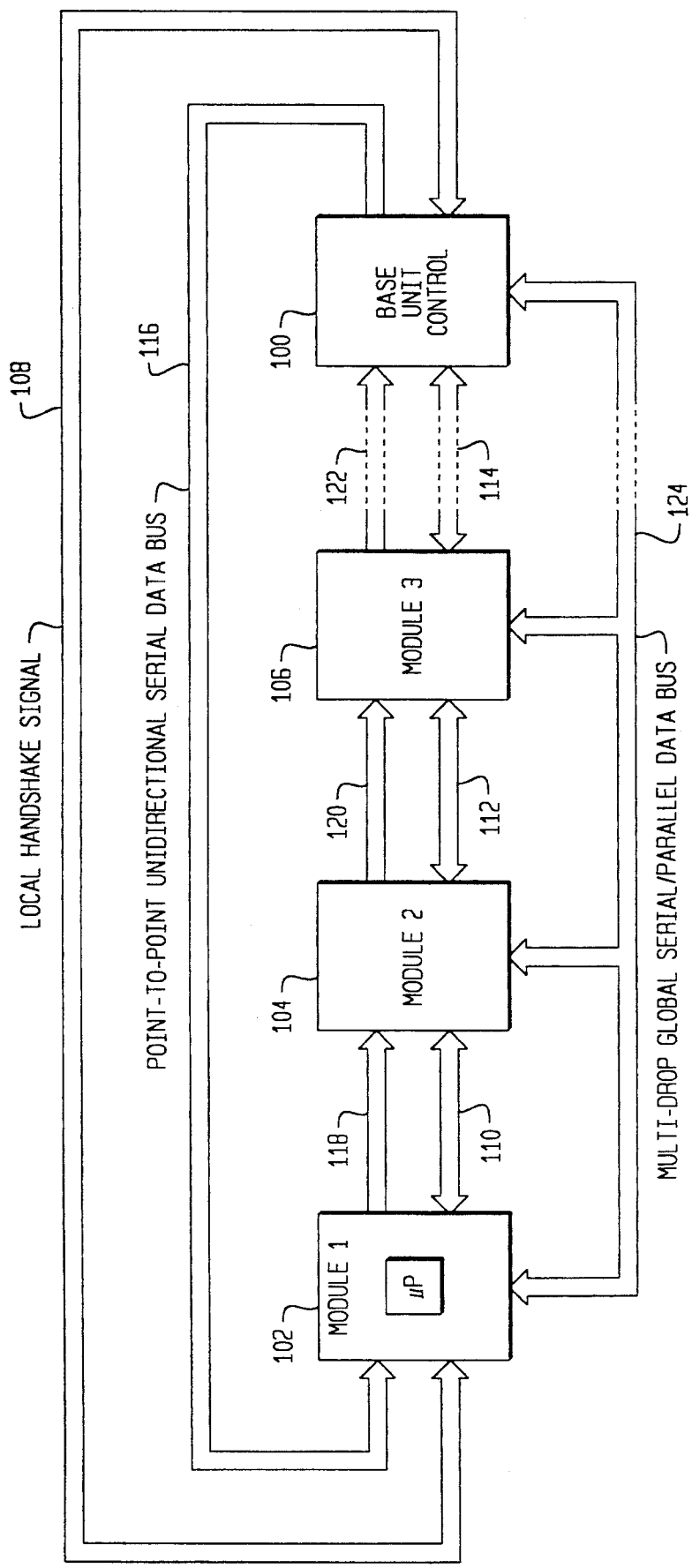
FIG. 2 is a block diagram of the interrelating electronics system for the operation of the apparatus of FIG. 1.

FIG. 2 is a block diagram of the electronics and communication system of the device of FIG. 1 which may be conveniently utilized for the control means in accordance with the invention. The base unit control electronics is illustrated at 100 while additional modules are indicated at 102, 104, and 106. Communication between the base unit and modules is shown by way of schematic communication lines indicated at 110 through 124. Further details of the system described above are available from U.S. Pat. No. 5,003,485 to Francisco which is specifically incorporated by reference herein. It will be understood that the microprocessor control system described above is for the purpose of illustrating a suitable environment and that the method in accordance with the invention may be implemented on any suitable microprocessor-based electronics platform.

Figure 3:
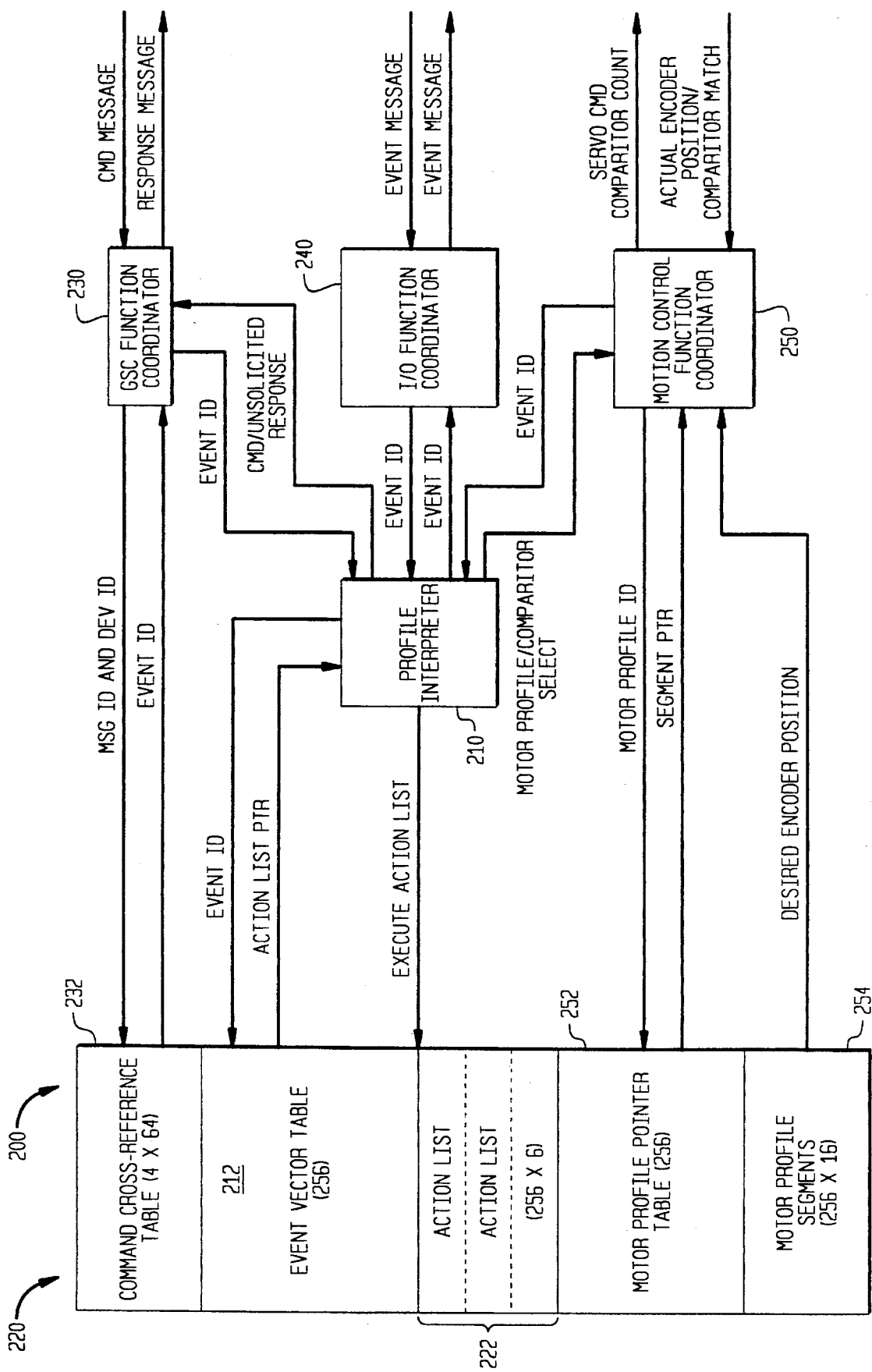
FIG. 3 is a functional block diagram of the device control softwares in accordance with the invention.

FIG. 3 illustrates at 200 a functional block diagram of the device control software in accordance with the invention. The profile interpreter block 210 is the heart of the software.

Upon receipt of an event ID from one of a plurality of sources, the profile interpreter 210 accesses the event vector table, illustrated at 212, of memory 220 to obtain an action list pointer for accessing a corresponding action from action lists stored at 222. In accordance with the invention, an event ID is generated from a plurality of sources. For example, the GSC function coordinator 230 receives a command message and determines from the command cross reference table 232 in memory 220 an event ID which is provided to profile interpreter 210. Similarly, I/O function coordinator block 240 receives an event message at its input which is converted to provide an event ID to the profile interpreter 210 from another module or device or sensor and provides an event ID to the profile interpreter 210.

The profile interpreter 210 also functions to command the motion control function coordinator block 250. The motion control block provides an event ID to the profile interpreter 210 which outputs the appropriate motor profile or comparator select command to actuate, for example, the desired drive motor. The motion control coordinator accesses the motor profile pointer table 252 with the desired motor profile ID and obtains a segment pointer and a desired encoder position from the motor profile segments stored at 254. The motion control block 250 outputs the desired servo motor command or comparator count and receives back the actual encoder position or comparator match which may in turn be used to provide a new event ID to the profile interpreter.

The basis of a functional profile is a set of event vector tables and event-action blocks. For every applicable event that occurs, a determined set of actions is performed. The sequences of action functions are triggered by the occurrence of hardware events and by other action functions.

The following types of controller events are thus available:

System command—sent by the host system to perform profile-specific functions.

Sensor lead-edge—detected from the on-board I/O input channel.

Sensor trail-edge—detected from the on-board I/O input channel.

Motor stall—detected by servo motor control software.

I/O channel error—detected by the I/O control software.

Motor channel error—detected by the servomotor control software.

Internal error—detected by the device control software.

The profile interpreter 210 processes action function sequences based on the received event input data, action function parameters, and hard-coded action function software routines. Table I lists the action function repertoire of physical and logical functions grouped by functionality.

TABLE I

Branch control—used for internal profile flow control.

Collation control/mailpiece tracking—used to track mailpieces through a paper path.

Configuration flag processing—used to enable/disable functional profile options.

Data log processing—used to collect statistical data.

Data output processing—used to actuate LEDs, solenoids, clutches, brakes,

Data value processing—used to maintain flags and counters.

Device speed control—used to select different mechanism speeds.

Device state processing—used to validate the state of a mechanical subsystem.

Device status processing—used to maintain status of a mechanical subsystem.

Encoder comparitor processing—used to detect positional events.

Encoder processing—used to quantify positional events.

Event processing—used to validate and detect events.

Motor control—used to actuate motors.

RS232 data input/output—used to support a local user interface.

Scan data input processing—used to collect off-board scanner data.

Sensor data input processing—used to detect sensor, switch, and A-to-D transitions.

System communications—used to perform host commands and return status and data to the host.

Timer processing—used to detect timed events.

Figure 4:
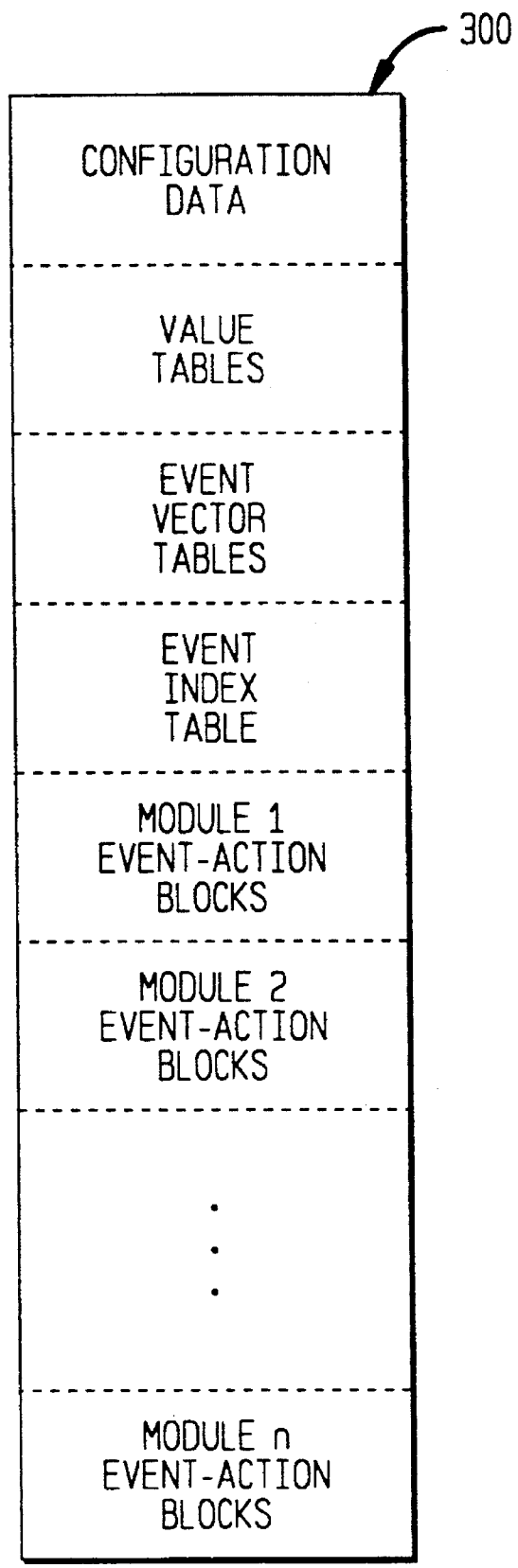
FIG. 4 illustrates the structure of the functional (event-action) profile.

FIG. 4 illustrates at 300 a preferred structure of the functional (event-action) profiles. Table II lists the preferred stored data and parameters illustrated in FIG. 4.

TABLE II

FUNCTIONAL (EVENT/ACTION) PROFILE STRUCTURE

| | | | CONFIGURATION DATA |
|---|---|---|---|
| config_flg | dsb | 8 | configuration option flags feature enable, error handling |
| config_val | dsb | 8 | configuration option values feature counts, values |
| config_err | dsb | 8 | error handling option flags |
| config_scan | dsw | 10*8 | scan field offset/length tables |
| | | | VALUE TABLES |
| timer_val | dsw | 20*11 | timer value tables one table per speed |
| encoder_val | dsw | 20*11 | encoder value tables one table per speed |
| | | | EVENT VECTOR TABLES |
| event_tbl | dsw | 256 | event-to-action index table |
| command_tbl | dsb | 32*4 | command-to-event vector tables one table per node address |
| sensle_tbl | dsb | 16*4 | LE sensor-to-event vector tables one table per sensor bank |
| senste_tbl | dsb | 16*4 | TE sensor-to-event vector tables one table per sensor bank |
| stall_tbl | dsb | 8 | motor stall-to-event vector table |
| ioerr_tbl | dsb | 8 | I/O error-to-event vector table |
| mtrerr_tbl | dsb | 8 | motor error-to-event vector table |
| error_tbl | dsb | 16+16 | internal error-to-event vct table |
| | | | ACTION FUNCTION LIST |
| action_lst | dsb | 1024*6 | event-action blocks |

Figure 5A:
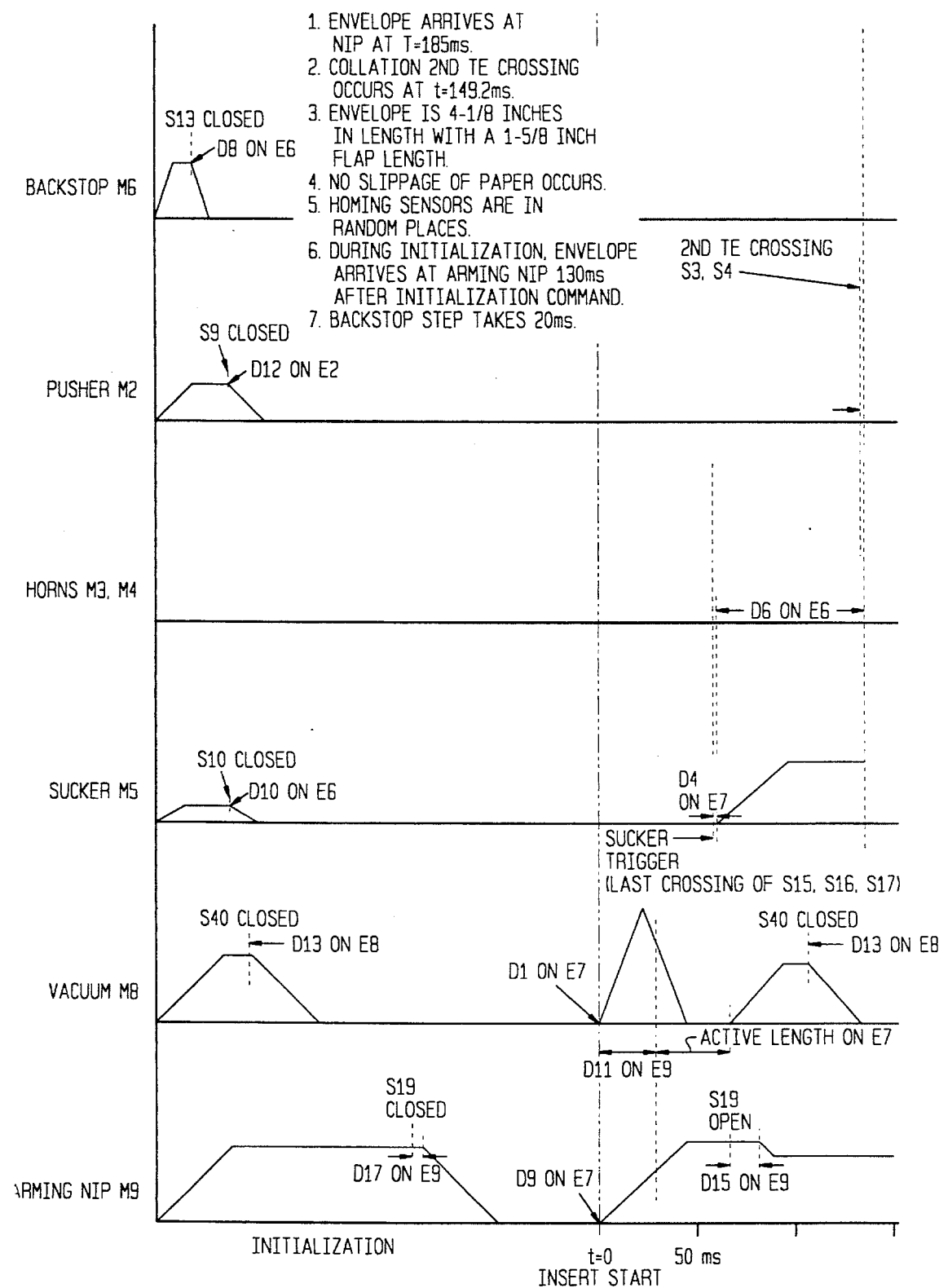
FIG. 5a and 5b comprise a typical timing diagram for an inserter module to illustrate the timing and operating sequence of the various drive motors of the inserter which may be used in/developing the respective profiles.
Figure 5B:
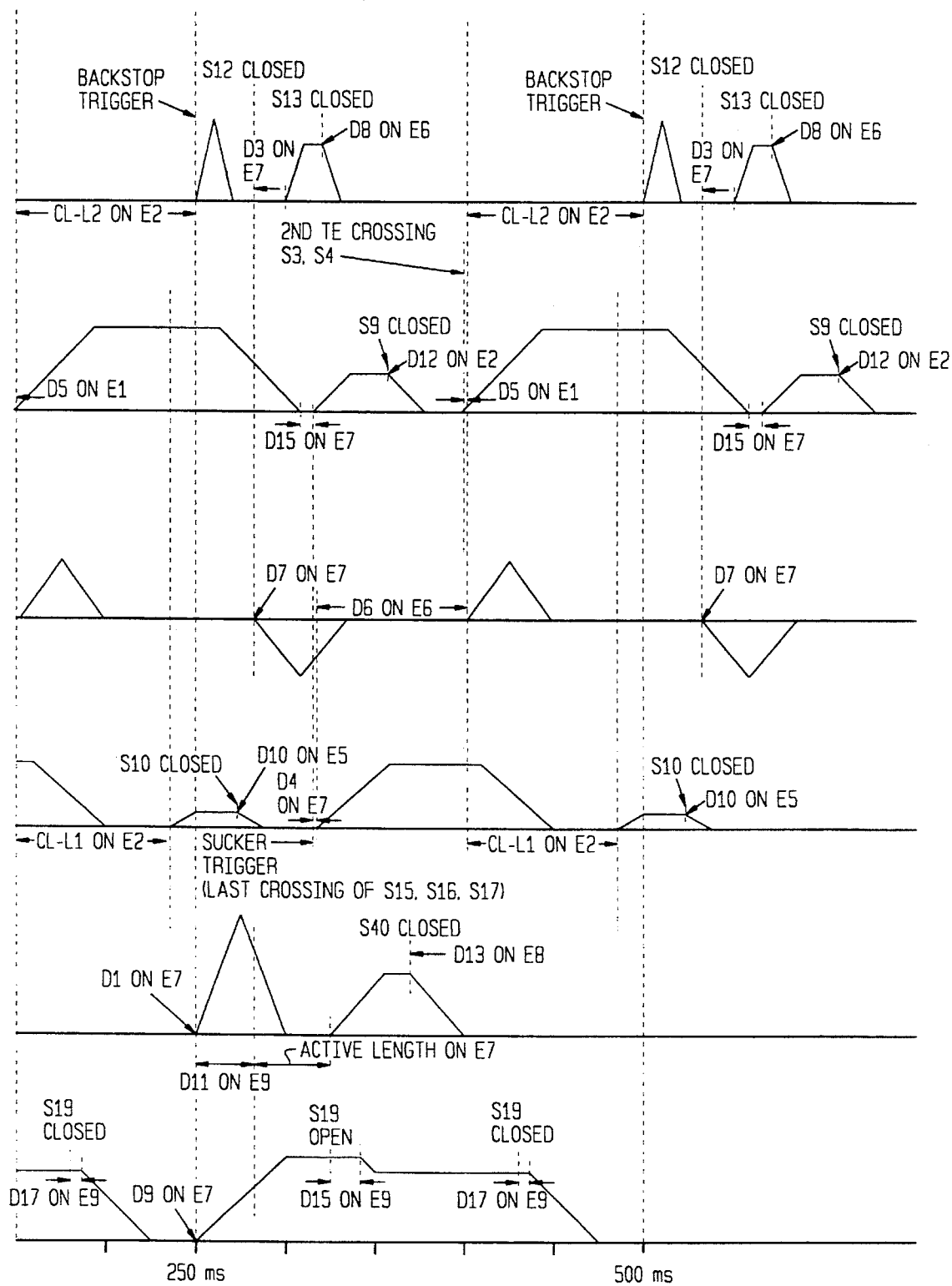

The profile generation process starts with a description of the mechanism to be controlled. A diagram of the device should preferably show all electro-mechanical devices, sensors, distances and paper flow. A timing diagram is also needed to show event sequences as well as timing. The timing diagram should include motor velocities, sensor events, solenoid actions and processing delays. It should preferably show homing, starting, steady and stopping states of the device if applicable. FIGS. 5a and 5b comprise a timing diagram of the operating sequence of the various drive motors of an insertion station. Since it is believed that the diagram is self-explanatory to those skilled in the art there is no need for detailed explanation of the various operating sequences, details of which are provided in U.S. patent application Ser. No. 08/144,466, filed Nov. 1, 1993, now U.S. Pat. No. 5,447,095 and U.S. patent application Ser. No. 08/338,707, filed Nov. 14, 1993 assigned to the assignee of the instant application and specifically incorporated by reference herein.

In accordance with the invention, each inserter module is associated with a unique device profile that is specialized for exactly the functions that need to be performed. It will be appreciated that profile parameters vary with different module configurations and mailpiece sizes. An event-action list is first created for a module and is then transformed into the functional profile format. It has been found advantageous to organize the event-action blocks into logical sections for ease of readability.

Preferably, a device profile for each different type of mechanical module is kept on a disc as a unique module profile file. For best results, each mechanical subsystem is logically partitioned such that the I/O requirements of its devices do not exceed the capabilities of the device controller. Again for best results, combined modules use different profile resources to avoid conflicts. Multiple modules of the same type must use different resources.

Based on a machine configuration as entered, for example, by a user, the functional profiles of the configurable mechanical modules can be sequentially linked together in different orders to form a complete custom device profile. Preferably, resources are assigned sequentially by resource type as module profiles are added to the functional profile. For best results, the module order determines the allocation of resources. Certain resources, such as configuration data, are in fixed format for each subsystem.

Preferably, job setup parameters that are required by each module are entered by the user and placed at the front end of the functional profile in order by module type. The placement and definition of configuration parameters is fixed to allow consistency among profiles created for different module configurations of the same mechanical subsystem.

Figure 6:
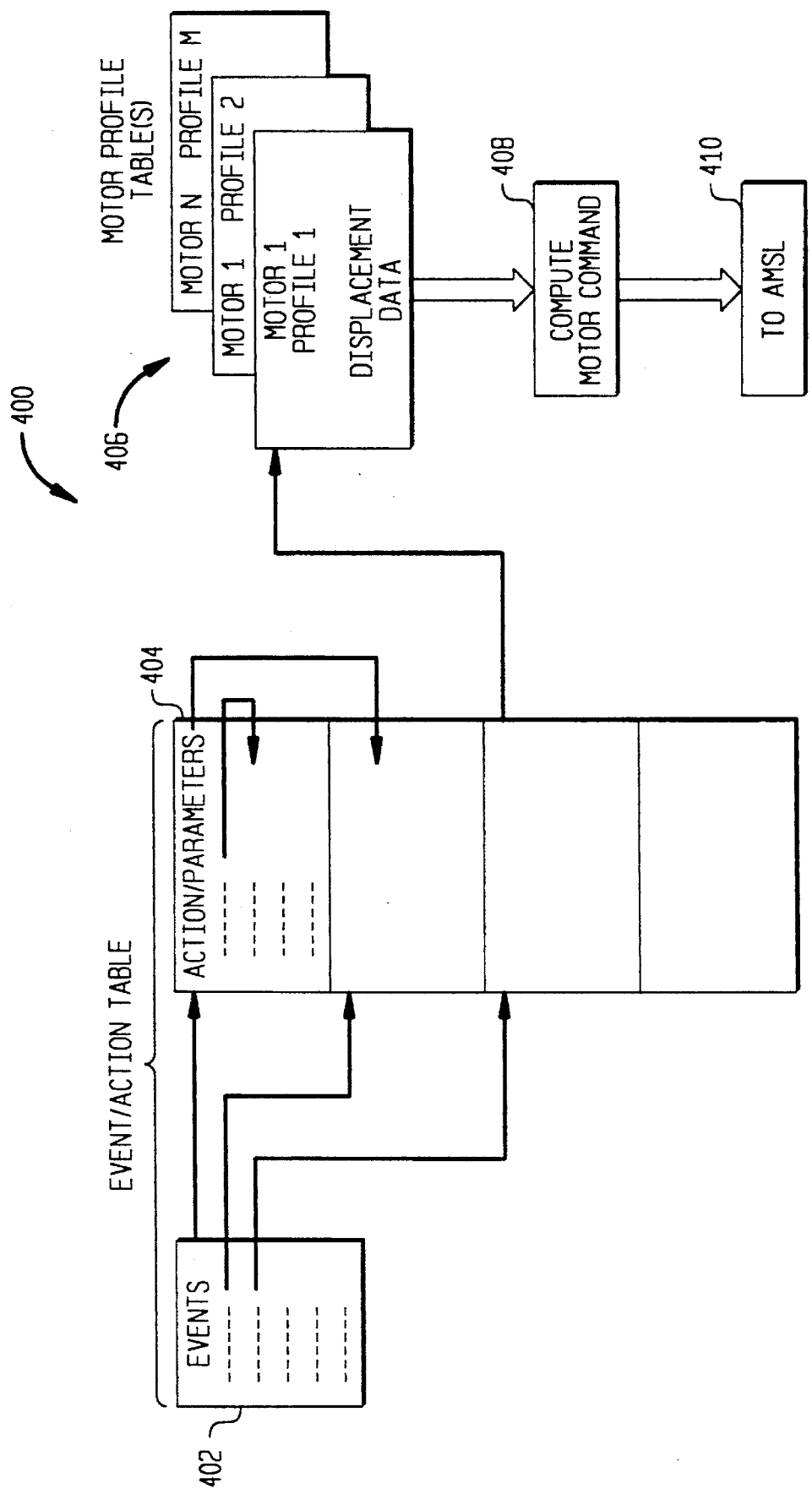
FIG. 6 schematically illustrates the device level control.

FIG. 6 schematically illustrates as indicated at 400 the method of control in accordance with the invention at the device level. The various applicable events are indicated at block 402 and which are vectored to the various corresponding determined actions of the action/parameters block 404 which together comprise the event/action table. Typically the action items result in the selection of a motor profile from among the plurality of motor profile tables indicated generally at 406. An output motor command is computed at 408 in accordance with the selected profile and the drive command is sent to the designated motor as indicated at 410.

Figure 7:
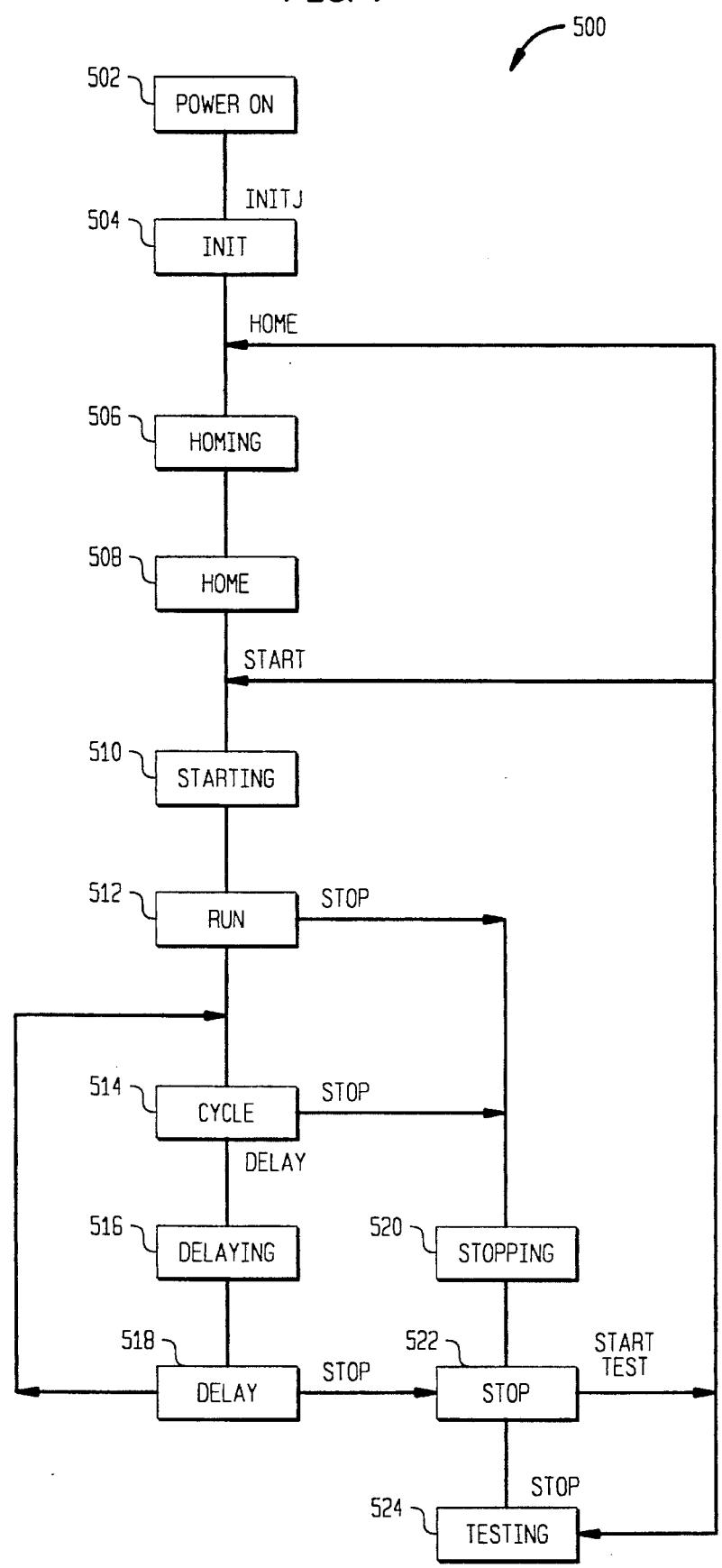
FIG. 7 illustrates the typical device state transitions.

FIG. 7 illustrates the typical device state transitions. In accordance with the invention, the device state is manipulated by a functional profile to keep track of the operational states of the device. Preferably, as seen at 500 the states are predefined for use by the profile. The flow chart of transitions illustrated begins with POWER ON at 502 which is the initial state after power on. An additional state LOADED (not shown) may be included if desired to show that the program has been loaded. The transition to the next state at 504, INIT is the initial state after the profile has loaded.

At 506, the HOMING transition state is flagged after the start command and while the device is moving its various devices to the home position and the state HOME, 508, is indicated when the homing is completed.

The next series of transition states are STARTING at 510 which represents the state after the start command while starting the device mechanisms, RUN at 512 which indicates the state after START is complete when the devices are homed and ready and possibly armed, and CYCLE at 514 as the devices are actively cycling, for example, cycling mailpieces.

Other state transitions are available as desired. The state DELAYING at 516 is the state while performing a controlled stop as a result of a stop command or in the absence of a feed command. DELAY at 518 is the state when waiting for the ready switch, single-feed switch, and/or system command to continue cycling. STOPPING at 520 is the state while immediately stopping the device as, for example, for a jam, interlock, emergency stop, or an empty stack. STOP indicated at 522 red, resents the state after STOPPING is complete; in this condition motors and comparators are preferably disabled.

JOGGING (not shown) may be used to indicate jogging. TESTING at 524 shows a diagnostic test state while another state PURGING (also not shown) may be used to indicate that the subsystem is purging.

Device status is set and sent to the host system by both the device control software and the functional profile. It will be appreciated that the different types of status may include informational status, internal errors and device errors.

Figure 8:
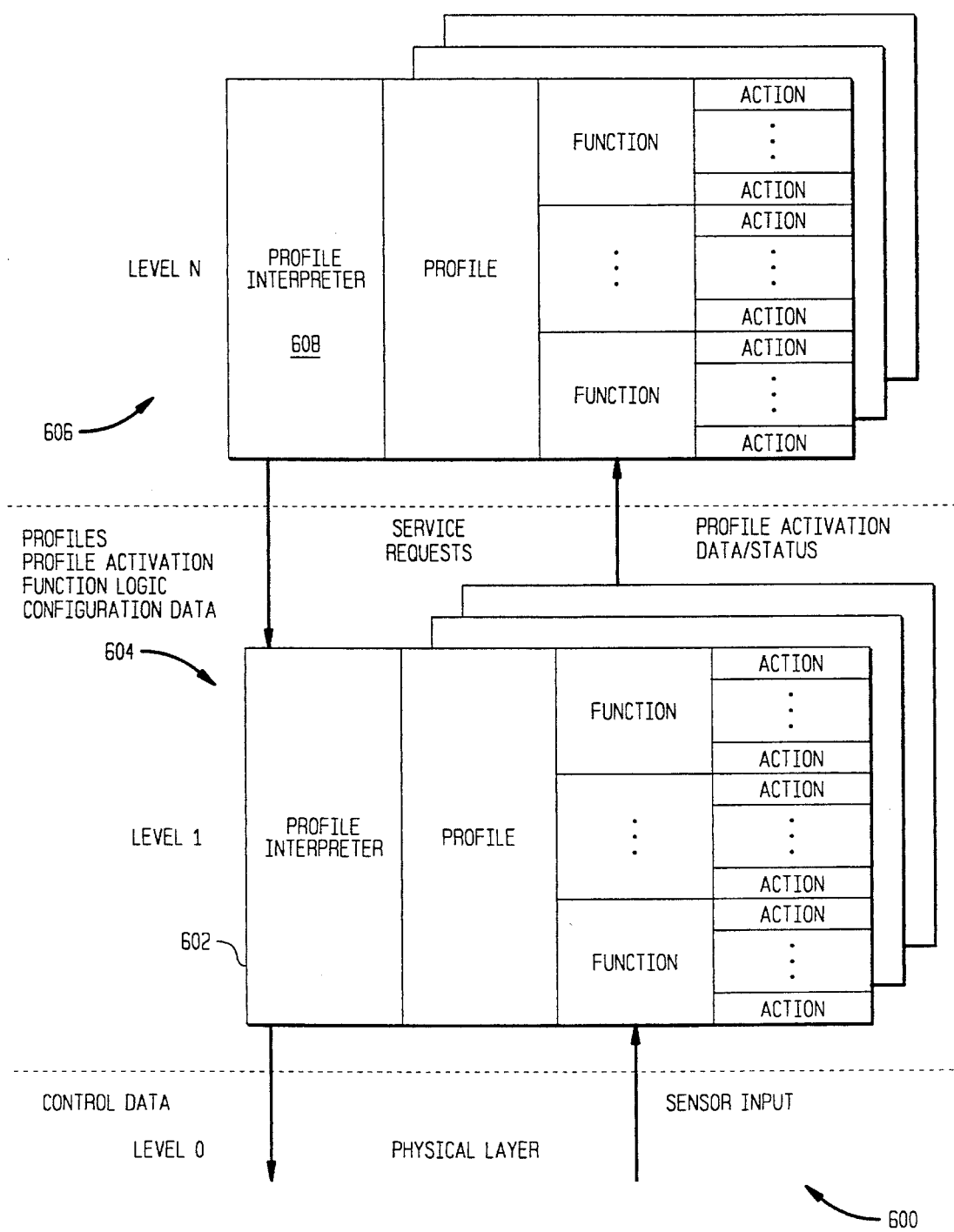
FIG. 8 shows the interaction among various levels of the software in accordance with the invention.

FIG. 8 shows the interaction among various levels of the software in accordance with the invention. Level 0 indicated at 600 is the physical layer of sensor input and motor control which communicates upwardly to the functional profile control block and the profile interpreter 602 immediately above at Level 1 which is indicated at 604. It will be appreciated that, as illustrated, the various levels can ascend hierarchically to a top level N indicated at 606 and its associated profile interpreter 608.

Figure 9:
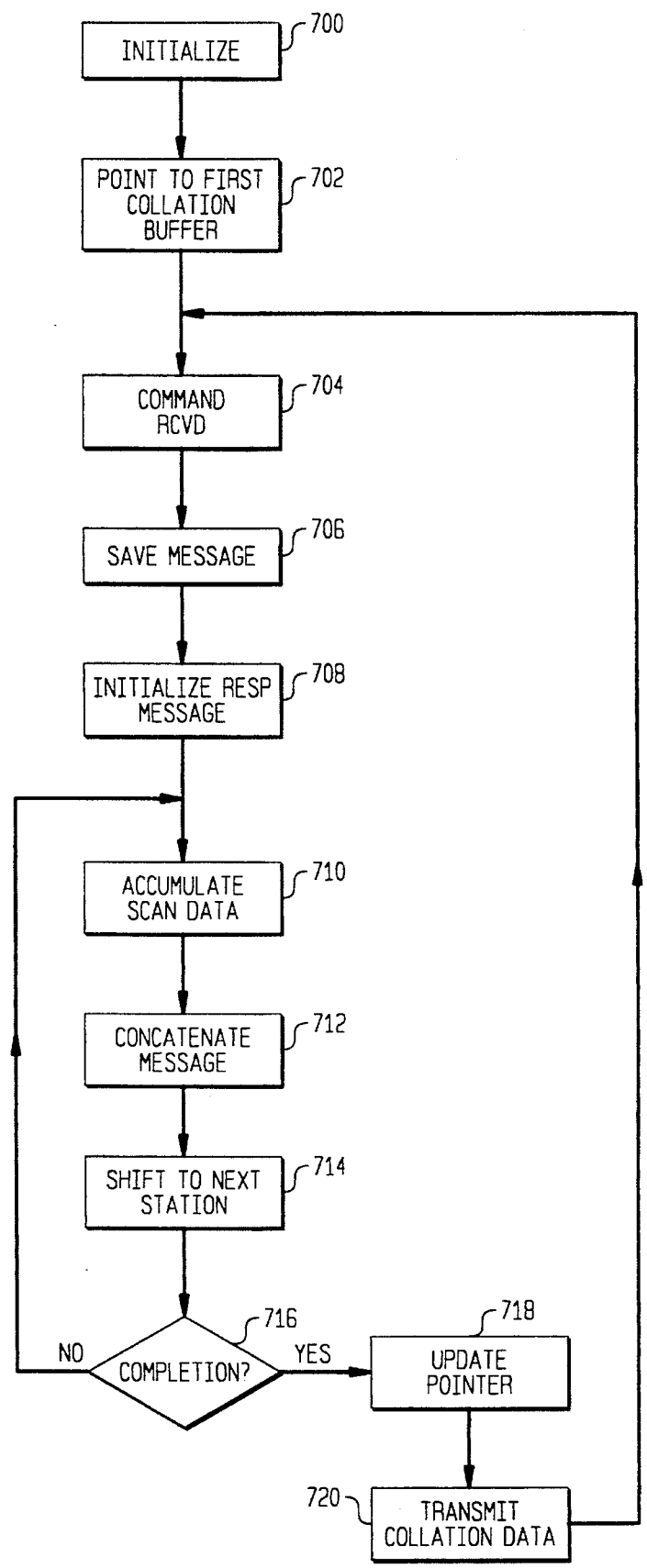
FIG. 9 is a flow chart of the tracking of a mailpiece within a functional profile.

FIG. 9 is a flow chart showing how the tracking of a mailpiece is preferably handled within a functional profile. Preferably in accordance with the invention, mailpieces are tracked within the functional profile by using a built-in action function for collation record buffer queuing. Suitably there are 16 collation buffers that are used to hold mailpiece status and data. There is also provided an array of 16 revolving buffer pointers that are used to point to the buffers. Upon initializing, block 700, each of the mailpiece collation buffer pointers is set to point to the first collation buffer, block 702. Collation records are then referenced by the station number which directly relates to the sequential position of the mailpiece within the paper path. Conveniently, each station is responsible for the tracking of only one mailpiece at any point in time.

When a command is received from the system, block 704, the message is saved in a collation record buffer, block 706, and a response message is initialized with status and mailpiece I.D., block 708. As scan data is accumulated, block 710, it is concatenated to the response message data portion of the collation record, block 712. At a convenient trigger point, the mailpiece is shifted from one station to the next in sequence, block 714. At block 716, if the collation is complete the corresponding buffer pointer for the next specified station number is updated at 718 to point to the next buffer (which will be used for the next mailpiece). When the mailpiece is completed, the collation record is sent to the system, block 720. Preferably, the record will comprise the original message header with the source and destination ID's swapped along with the response message size, status, mailpiece ID and message data.

It will be appreciated that the collation buffers and buffer pointers can be split into separate groups that operate independently in the same way as the single queue previously described. When the buffer pointers are initialized, each buffer pointer points to the first buffer of its corresponding group. When the buffer pointers are updated the pointers revolve within each group.

It will be understood that each collation group may then be used to track mailpieces within a paper path that will be merged with another paper path. In such a case, when it is time to shift a collation from one paper path to another, a collation group transfer is initiated. A similar process is also used when accumulating single mailpieces into a larger mailpiece.

What is claimed is:

1. A method for controlling a plurality of operations in a microprocessor-controlled apparatus, the method comprising the steps of defining and storing in a memory an event vector table and a plurality of event action blocks which provide a determined set of actions to be performed in correspondence to activation by respective determined events, wherein said event vector table includes a plurality of pointers each of which corresponds to one of the action blocks, and providing determined action function sequences and a profile interpreter for processing the action function sequences, upon receipt of indication of occurrence of at least one of the determined events, the profile interpreter commanding the corresponding actions and setting a corresponding event-occurred flag and thereafter commanding other actions and manipulating the flag by operation of respective profile action functions associated with the respective operations of the apparatus.

2. The method of claim 1 wherein there are hierarchically-arranged levels of profile interpreters for processing the action-function sequences.

3. The method of claim 1 further comprising the step of providing an indication of the state of operation of a device.

4. The method of claim 1 wherein the operations are inserter operations and the profile action function is a mail-tracking function.

5. The method of claim 1 further comprising the step of communicating the status of an associated device.

6. A method for controlling a plurality of inserter operations in a microprocessor-controlled inserter apparatus, the method comprising the steps of defining and storing in a memory an event vector table and a plurality of event action blocks which provide a determined set of actions to be performed by the inserter apparatus in correspondence to activation by respective determined events, wherein said event vector table includes a plurality of pointers each of which corresponds to one of the action blocks, and providing determined action function sequences and a profile interpreter for processing the action function sequences, and upon receipt of indication of occurrence of at least one of the determined events, the profile interpreter commanding the corresponding actions and setting a corresponding event-occurred flag for manipulation by operation of respective profile action functions associated with the respective operations of the inserter apparatus.

7. The method of claim 6 wherein one of said action function sequences is a mailpiece-tracking sequence.

8. The method of claim 6 further comprising the step of providing an indication of the state of operation of a device.

9. The method of claim 6 further comprising the step of communicating the status of an associated device.

* * * * *